US008037775B2

(12) United States Patent
Imholt et al.

(10) Patent No.: US 8,037,775 B2
(45) Date of Patent: Oct. 18, 2011

(54) PASSIVE HIT LOCATOR SYSTEM COMPRISING CARBON NANOTUBE ARRAYS

(75) Inventors: Timothy J. Imholt, Richardson, TX (US); Gary A. Frazier, Garland, TX (US)

(73) Assignee: Raytheon Company, Waltham, MA (US)

( * ) Notice: Subject to any disclaimer, the term of this patent is extended or adjusted under 35 U.S.C. 154(b) by 258 days.

(21) Appl. No.: 12/253,419

(22) Filed: Oct. 17, 2008

(65) Prior Publication Data
US 2010/0095786 A1 Apr. 22, 2010

(51) Int. Cl.
G01L 5/00 (2006.01)
G01L 1/00 (2006.01)
G01N 23/00 (2006.01)
(52) U.S. Cl. .............. 73/862.68; 977/953; 977/956
(58) Field of Classification Search .......... 73/862.68; 977/953, 956
See application file for complete search history.

(56) References Cited

U.S. PATENT DOCUMENTS

| | | | |
|---|---|---|---|
| 6,286,226 B1* | 9/2001 | Jin | 33/706 |
| 7,491,428 B2* | 2/2009 | Smits et al. | 427/458 |
| 7,564,246 B2* | 7/2009 | Choi et al. | 324/460 |
| 7,682,694 B1* | 3/2010 | Gintz et al. | 428/364 |
| 2006/0076736 A1* | 4/2006 | Hodge | 273/373 |
| 2006/0253942 A1* | 11/2006 | Barrera et al. | 977/852 |
| 2007/0035528 A1* | 2/2007 | Hodge | 345/174 |
| 2007/0128960 A1* | 6/2007 | Ghasemi Nejhad et al. | 442/59 |
| 2008/0129278 A1* | 6/2008 | Dai et al. | 324/109 |
| 2009/0047453 A1* | 2/2009 | Folaron et al. | 428/34.1 |
| 2009/0282671 A1* | 11/2009 | Tao et al. | 29/621.1 |
| 2009/0293631 A1* | 12/2009 | Radivojevic | 73/774 |

OTHER PUBLICATIONS

K. J. Loh, T C. Hou, J. P. Lynch, N. A. Kotov. "Nanotube-based Sensing Skins for Crack Detection and Impact Monitoring of Structures." Proceedings of the 6th Int. Workshop on Structural Health Monitoring. Standford, CA. Sep. 11-13, 2007.*

A. N. Watkins, J. L. Ingram, J. D. Jordan, R. A. Wincheski, J. M. Smits, P. A. Williams. "Single Wall Carbon Nanotube-Based Structural Health Sensing Materials." NSTI-Nanotech. 2004. pp. 149-152.*

G. R. Kirikera, J. W. Lee, M. J. Schulz, A. Ghosal, M. J. Sundaresan, R. J. Allemang, V. N. shanov, H. Westheider. "Initial evaluation of an active/passive structural neural system for health monitoring of composite materials." Smart Mater. Struct. 15. 2006. pp. 12775-1286.*

Kroto, H. W., et al., "$C_{60}$: Buckminsterfullerene", Letters to Nature, vol. 318, pp. 162-163, Nov. 14, 1985.

Iijima, Sumio, "Helical microtubules of graphitic carbon", Letters to Nature, vol. 354, pp. 56- 58, Nov. 7, 1991.

Feynman, Richard P., "There's Plenty of Room at the Bottom", reprinted with permission from Journal of Microelectromechanical Systems, vol. 1, No. 1, pp. 3-9, Mar. 1992.

(Continued)

Primary Examiner — Lisa Caputo
Assistant Examiner — Punam Roy
(74) Attorney, Agent, or Firm — Baker Botts L.L.P.

(57) ABSTRACT

A system for locating impacts comprises at least one array of a plurality of carbon nanotubes, each carbon nanotube operable to emit electrical activity when compressed. The system also comprises at least one sensor coupled to the at least one array configured to detect emitted electrical activity from the plurality of carbon nanotubes. Furthermore, a computer is configured to determine the location of an impact on the at least one array in response to the detected emitted electrical activity from the plurality of carbon nanotubes.

17 Claims, 4 Drawing Sheets

OTHER PUBLICATIONS

Ajayan, P. M., "*Opening carbon nanotubes with oxygen and implications for filling*", Letters to Nature, vol. 362, pp. 522-525, Apr. 8, 1993.

Dujardin, E., et al., "*Capillarity and Wetting of Carbon Nanotubes*", Science, vol. 265, pp. 1850-1852, Sep. 23, 1994.

Ausman, Kevin D., "*Organic Solvent Dispersions of Single-Walled Carbon Nanotubes: Toward Solutions of Pristine Nanotubes*", The Journal of Physical Chemistry B, vol. 104, No. 38, pp. 8911-8915, Sep. 28, 2000.

Bahr, Jeffrey L., "*Dissolution of small diameter single-wall carbon nanotubes in organic solvents?*", Chem. Commun., 2001, pp. 193-194, 2001.

Fujiwara, Akihiko, et al., "Gas adsorption in the inside and outside of single-walled carbon nanotubes", Chemical Physics Letters 336, pp. 205-211, Mar. 16, 2001.

Pirlot, Christophe, et al., "Preparation and Characterization of Carbon Nanotube/Polyacrylonitrile Composites**", Advanced Engineering Materials 2002, 4, No. 3, pp. 109-114, 2002.

Imholt, T. J., et al., "*Nanotubes in Microwave Fields: Light Emission, Intense Heat, Outgassing, and Reconstruction*", Chem. Mater. 2003, pp. 3969-3970, 2003.

Mamalis, A. G., et al. "*Nanotechnology and nanostructured materials: trends in carbon nanotubes*", Precision Engineering, 28, pp. 16-30, 2004.

Zhang, Mei, et al., "*Multifunctional Carbon Nanotube Yarns by Downsizing an Ancient Technology*", Science, vol. 306, pp. 1358-1361, Nov. 19, 2004.

Kang, Inpil, et al., "*Introduction to carbon nanotube and nanofiber smart materials*", Composites Part B 37, Science Direct, pp. 382-394, 2006.

* cited by examiner

PASSIVE HIT LOCATOR SYSTEM COMPRISING CARBON NANOTUBE ARRAYS

TECHNICAL FIELD

This invention relates generally to locator systems and more particularly to a passive hit locator system.

BACKGROUND

In combat situations, it may be advantageous to know the location of damage from projectiles on equipment. Such functionality would give insight to the personnel being fired upon in that they may be able to determine from which direction the fire was originating as well as what equipment may have been damaged by the projectiles. Similar functionality may be built in to body armor which may increase the probability of saving a life by providing instant wound information.

One solution for providing this functionality uses an active sensor system to detect the hits. A powered circuit is connected to the equipment, and when a hit occurs, parts of the circuit are broken. Detecting the location of the broken part of the circuit indicates where a hit took place. However, this requires that the circuit be continually powered. This leads to increased cost and complexity as batteries may have to be integrated into the system as well. The increased weight is also problematic, especially in body armor applications.

SUMMARY

According to one embodiment, a system for locating impacts includes at least one array of a plurality of carbon nanotubes. Each carbon nanotube is operable to emit electrical activity when compressed. The system also includes at least one sensor coupled to the at least one array that is configured to detect emitted electrical activity from the plurality of carbon nanotubes. A computer is configured to determine the location of an impact on the at least one array in response to the detected emitted electrical activity from the plurality of carbon nanotubes.

The system may include situating the at least one array of carbon nanotubes in a garment. The at least one array of carbon nanotubes may also be situated in a vehicle. Also, the plurality of carbon nanotubes may include single walled carbon nanotubes. In addition, the at least one array of carbon nanotubes may include two arrays of a plurality of carbon nanotubes. These two arrays of a plurality of carbon nanotubes may also be configured into a grid.

According to another embodiment, a method for locating impacts includes aligning a plurality of carbon nanotubes into at least one array and detecting electrical emissions from at least one of the plurality of carbon nanotubes of the at least one array in response to application of pressure on the at least one array. The method also includes computing the location of impact upon the at least one array based on which of the plurality of carbon nanotubes emitted electrical activity.

Depending on the specific features implemented, particular embodiments may exhibit some, none, or all of the following technical advantages. According to one embodiment, a system for locating impacts may be provided that adds almost no weight to equipment it is placed on, making it inexpensive to deploy. Further, the use of carbon nanotubes reduces the need for external power, such as through batteries, which causes the system to be less expensive and facilitates deployment. Other technical advantages will be readily apparent to one skilled in the art from the following figures, description, and claims.

BRIEF DESCRIPTION OF THE DRAWINGS

Reference is now made to the following description taken in conjunction with the accompanying drawings, wherein like reference numbers represent like parts and which.

DETAILED DESCRIPTION

Figure 1A:
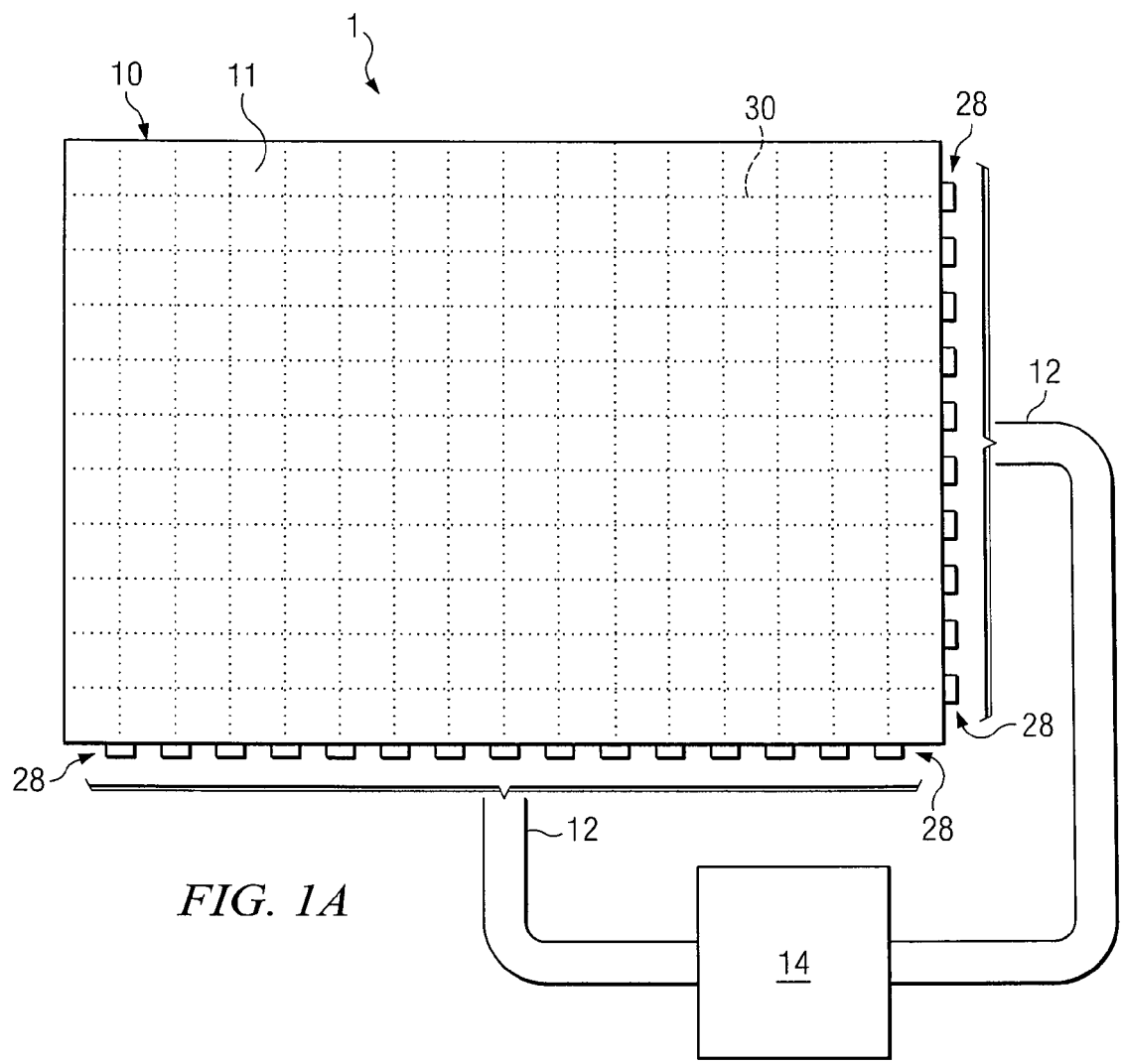
FIG. 1A illustrates one embodiment of a hit locator system according to the teachings of the disclosure.

FIG. 1A illustrates one embodiment of hit locator system 1 according to the teachings of the disclosure. Hit locator system 1 includes hit sensor 10 coupled to computer 14 via connections 12. Hit sensor 10 further includes cover 11, under which lie tubes 30. Tubes 30 are coupled to sensors 28. Sensors 28 are coupled to computer 14 via connections 12. In some embodiments, hit sensor 10 may be impacted causing tubes 30 to be compressed. When compressed, tubes 30 emit electrical activity. Sensors 28 may be configured to send signals to computer 14 via connections 12 in response to the electrical activity. Some of the signals transferred to computer 14 may be processed to determine if and where hit sensor 10 has been impacted.

Tubes 30, in some embodiments, are carbon nanotubes as discussed further below. In some embodiments, sensors 28 are electrodes. Connections 12 may be any configuration of components that allows for electrical transmission. In one example, connections 12 include at least one wire. In other examples, connections 12 include at least one bus. In still other examples, connections 12 may include wireless communication, such as IR, RF communication, or any other form of electromagnetic transmission. As examples only, other types of electromagnetic transmission include using Bluetooth technology and/or the IEEE 802.11 technology family.

Figure 1B:
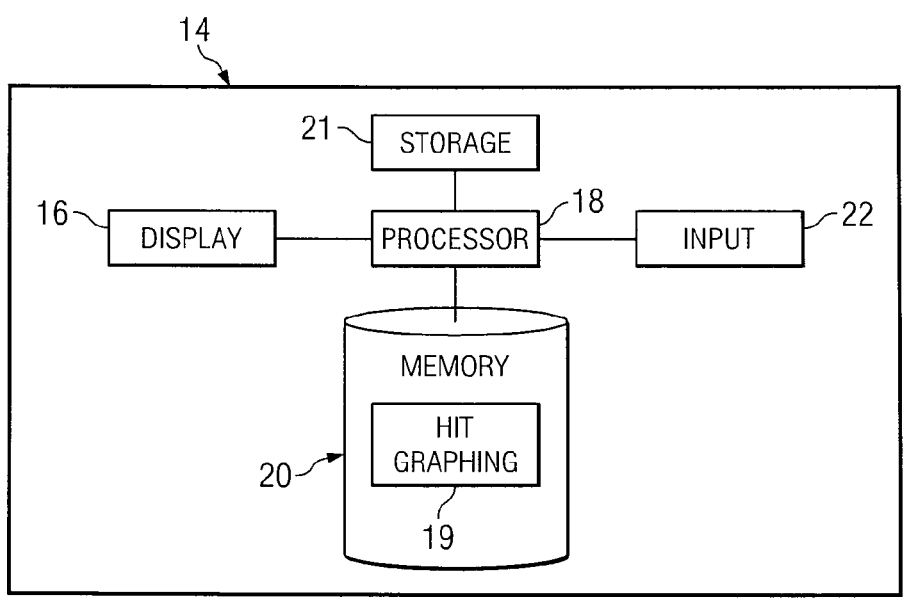
FIG. 1B illustrates one embodiment of a computer that may be used with the hit locator system of FIG. 1A.

FIG. 1B illustrates one embodiment of computer 14. In this embodiment, computer 14 includes display 16, processor 18, hit graphing application 19, memory 20, storage 21 and input 22. In particular embodiments, computer 14 may be configured to receive signals from hit sensor 10 and utilize hit graphing application 19 to indicate the location of an impact upon hit sensor 10. Some embodiments of this process are discussed further below with respect to FIG. 3. In certain embodiments, computer 14 may include some or none of those components. In other embodiments, computer 14 may be a handheld device, such as a Personal Digital Assistant (PDA) or mobile telephone. Computer 14 may be capable of producing sounds instead of, or in addition to, a visual display. Computer 14 may also include a database containing information about equipment co-located with hit sensor 10. In particular embodiments, this database is stored in storage 21.

Display 16, in some embodiments, may include projectors, OLED screens, LCDs, CRT monitors, LED monitors, or any other suitable device or devices for displaying sensed hit information. In various embodiments, display 16 may include devices suitable for tactile feedback, such as haptic displays or surfaces. Display 16 may also include printers or plotters. In still other embodiments, display 16 may include devices suitable for providing audible feedback, such as speakers.

Memory 20 stores hit graphing application 19. Hit graphing application 19 processes signals delivered to computer 14 via connections 12 and utilizes display 16 to indicate the presence of impacts upon hit sensor 10. In some embodiments, hit graphing application 19 further determines the location of impacts upon hit sensor 10, as discussed below with respect to FIG. 3.

Memory 20 and storage 21 may include files, stacks, databases, or other suitable forms of data. Memory 20 and storage 18 may be random access memory, read-only memory, CD-ROM, removable memory devices or other suitable devices that allow storage and/or retrieval of data. Memory 20 and storage 18 may be interchangeable and may perform the same functions. However, in the below examples, memory 20 will be used for storage and retrieval of data conventionally stored in random access memory, and storage 21 will perform the functions associated with data conventionally stored in read-only memory.

Processor 18 is operable to execute the logic of programs stored in memory 20 or storage 21. Examples of processor 12 are the Pentium series processors available from Intel Corporation; however, any type of processor may be used without departing from the teachings of the invention.

Input 22, in some embodiments, may include keyboards, mice, touchpads, touch screens, microphones, optical receivers, or any other device suitable for inputting information into computer 14.

Figure 2A:
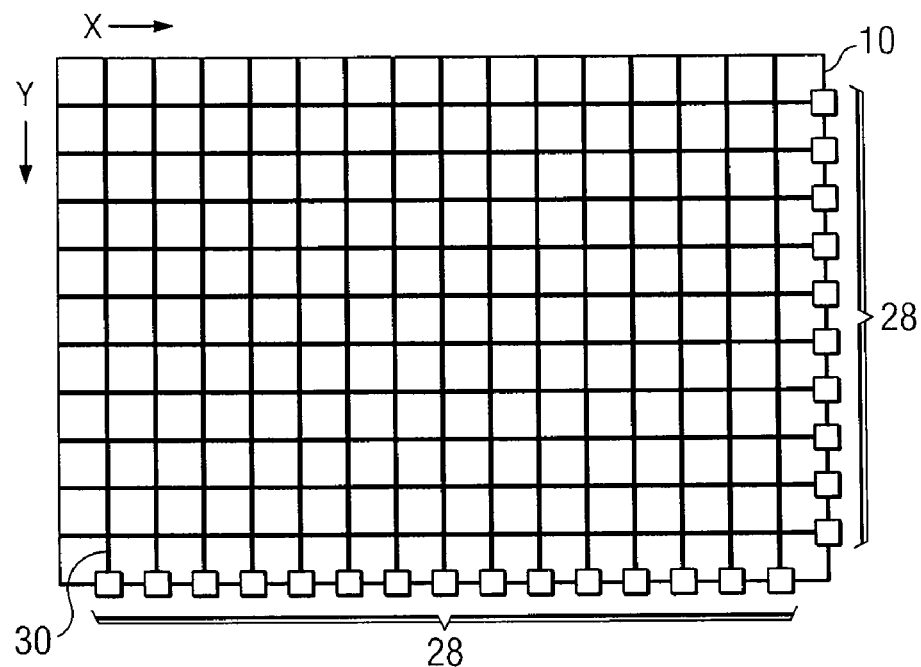
FIG. 2A illustrates the hit sensor of FIG. 1A with the cover removed.

FIG. 2A shows one embodiment of hit sensor 10. Here, cover 11 is not shown. In this embodiment, hit sensor 10 includes two arrays of tubes 30 which are arranged in a grid configuration and electrically coupled to sensors 28. Sensors 28 may be composed of any suitable metallic conducting material, such as copper, silver, or gold. Further, sensors 28 may be composed of non-metallic conducting material, such as graphite. In other embodiments, tubes 30 may be arranged in a different configuration, such as a hexagonal configuration. When tubes 30 are compressed, they emit electrical activity.

Figure 2B:
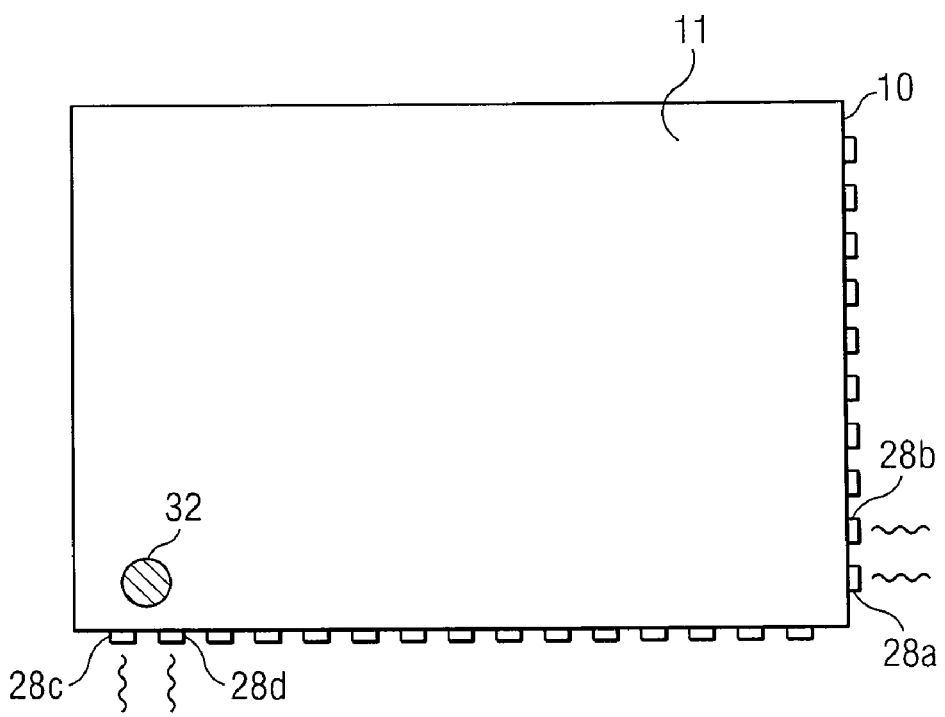
FIG. 2B illustrates one embodiment of the operation of the hit sensor of FIG. 2A.

FIG. 2B illustrates one embodiment of the operation of hit sensor 10. In certain embodiments, when hit sensor 10 has been impacted at impact area 32, tubes 30 underneath impact area 32 are compressed. The compressed tubes 30 emit electrical activity which is transmitted by sensors 28 to computer 14. In this example, sensors 28a and 28b correspond to the Y-axis of impact area 32 while sensors 28c and 28d correspond to the X-axis of impact area 32. In some embodiments, computer 14 may process the received signals from sensors 28 and display a graph corresponding to the location of the impact on hit sensor 10.

Tubes 30 may be single walled carbon nanotubes (SWCNT). When aligned and in composite material, SWCNT will emit electrons when compressed. One way of achieving a grid configuration of SWCNT is to take two layers of composite material in which the SWCNT have been aligned and put one on top of another such that one layer has its SWCNT aligned perpendicularly to the other layer's SWCNT. In order to obtain aligned SWCNT in composites across sufficient lengths a variety of options are available. One option involves extrusion. Mechanical extruders disperse the SWCNT across large composite materials. The extrusion process may lead to the breaking up of the nanotubes. As a result, a microwave field is applied to the composite materials and causes the nanotubes to link up. Another option is to mix the SWCNT with an uncured composite host. During and after the physical mixing an electric field is applied to the composite as it cures; a magnetic field may also be used instead of an electric field though the following discussion focuses on the use of an electric field. This passing of electricity through the material serves to physically move the nanotubes to a point where they will be aligned and dispersed with the electric field lines. This dispersion/alignment will be maintained and in some cases continually improved until either the composite cures or the electric field is removed. It is most advantageous to wait for the composite to cure. A modification to the SWCNT may make this process more effective. This modification involves placing the SWCNT in a liquid and then evaporating the liquid; one example of a suitable liquid is water. Evaporating water in the presence of CNTs has the effect of caused the resulting hydrogen and oxygen atoms of being adsorbed or absorbed by the SWCNT allowing easier dispersion and alignment along the electric field lines.

Another option for disbursement and alignment in the composite material involves using yarn made from SWCNT. It is possible to use nanotube-based yarn along with traditional textile techniques to produce a woven cloth of nanostructures suitable for a hit locator system.

Disbursing and aligning the carbon nanotubes may also affect properties of the composite material, including its hardness. The following table illustrates how the hardness of the composite material may be affected by the nanotubes:

| Material | Hardness (Durometer D Scale) |
|---|---|
| Original Material (without the nanotubes) | 55 |
| Material with unaligned nanotubes | 45 |
| Material with partially aligned nanotubes | 70 |
| Material with well aligned nanotubes | 90 |

An advantage to the system is illustrated in the table above. For nearly zero additional weight, a harder material may be realized. This is especially advantageous in armor applications where a harder material may increase the armor's effectiveness against projectiles.

Figure 3:
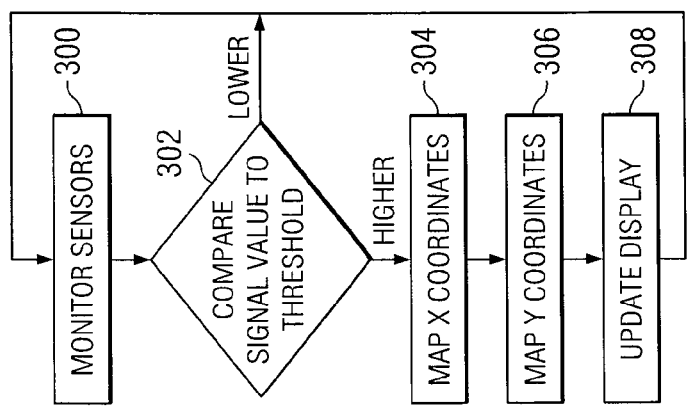
FIG. 3 is a flowchart describing the operation of one embodiment of a hit locator system according to the teachings of the disclosure.

FIG. 3 is a flowchart describing the operation of one embodiment of a hit locator system. In step 300 of this embodiment, the output of sensors 28 of hit locator 10 are monitored. In some embodiments, the monitoring may be done by computer 14 through hit graphing application 19. In step 302, the voltage across sensors 28 is compared to a threshold voltage. In some embodiments, the threshold voltage is in the microvolt range. If the voltages associated with sensors 28 are lower than the threshold, the leads continue to be monitored. However, if any of the sensors 28 have a voltage higher than the threshold, then the system proceeds to step 304. In step 304, sensors 28 corresponding to the X-axis of hit locator 10 which had a voltage higher than the threshold are mapped to a set of X-coordinates. In step 306, sensors 28 corresponding to the Y-axis of hit locator 10 which had a voltage higher than the threshold are mapped to a set of Y-coordinates. The mapping in steps 304 and 306 may be accomplished, in some embodiments, by hit graphing application 19 of FIG. 1B using suitable logic to compute the incoming signals into location information. Steps 304 and 306 may be completed in any order; further, in other embodiments, steps 304 and 306 may be completed simultaneously. In step 308, display 16 is updated to reflect the X and Y coordinates of the sensors 28 having voltages higher than the threshold. The system continues to step 300 where it monitors the leads.

In certain embodiments, when hit locator 10 has not been impacted, tubes 30 are not emitting electrical activity and the results of step 300 are that sensors 28 have a very low voltage. Thus, when these voltage levels are compared to the threshold in step 302, the system returns to step 300 and continues to monitor the leads because the voltages are lower than the threshold.

However, in some embodiments, when hit locator 10 has been impacted by a projectile certain tubes 30 may have been compressed and emit electrical activity which is transmitted to sensors 28a-d. In step 302, the voltage from sensors 28a-d are higher than the threshold. Thus, in step 304, an X-coordinate is generated based on the fact that sensors 28c and 28d are emitting voltages higher than the threshold. Further, in step 306, a Y-coordinate is generated based on the fact that sensors 28a and 28b are emitting voltages higher than the threshold. These generated coordinates are used in step 308 to update display 16 such that in indication of the location of impact area 32 is communicated. After this first impact, tubes 30 remain compressed so that the voltages on sensors 28a-d remain higher than the threshold; thus, the indication of the location of impact area 32 remains displayed.

In particular embodiments, hit locator 10 is impacted twice by a first and second projectile creating a first and second impact area 32. As a result, in certain embodiments, two sets of tubes 30 are compressed, causing a voltage higher than the threshold to appear on two sets of sensors 28. In some embodiments, a further result of the second impact is that two sets of X and Y coordinates are generated in steps 304 and 306 since there are now two sets of sensors 28 emitting voltages higher than the threshold. In step 308, display 16 is updated now showing two locations of impact, corresponding with the two sets of X and Y coordinates generated in steps 304 and 306.

Figure 4B:
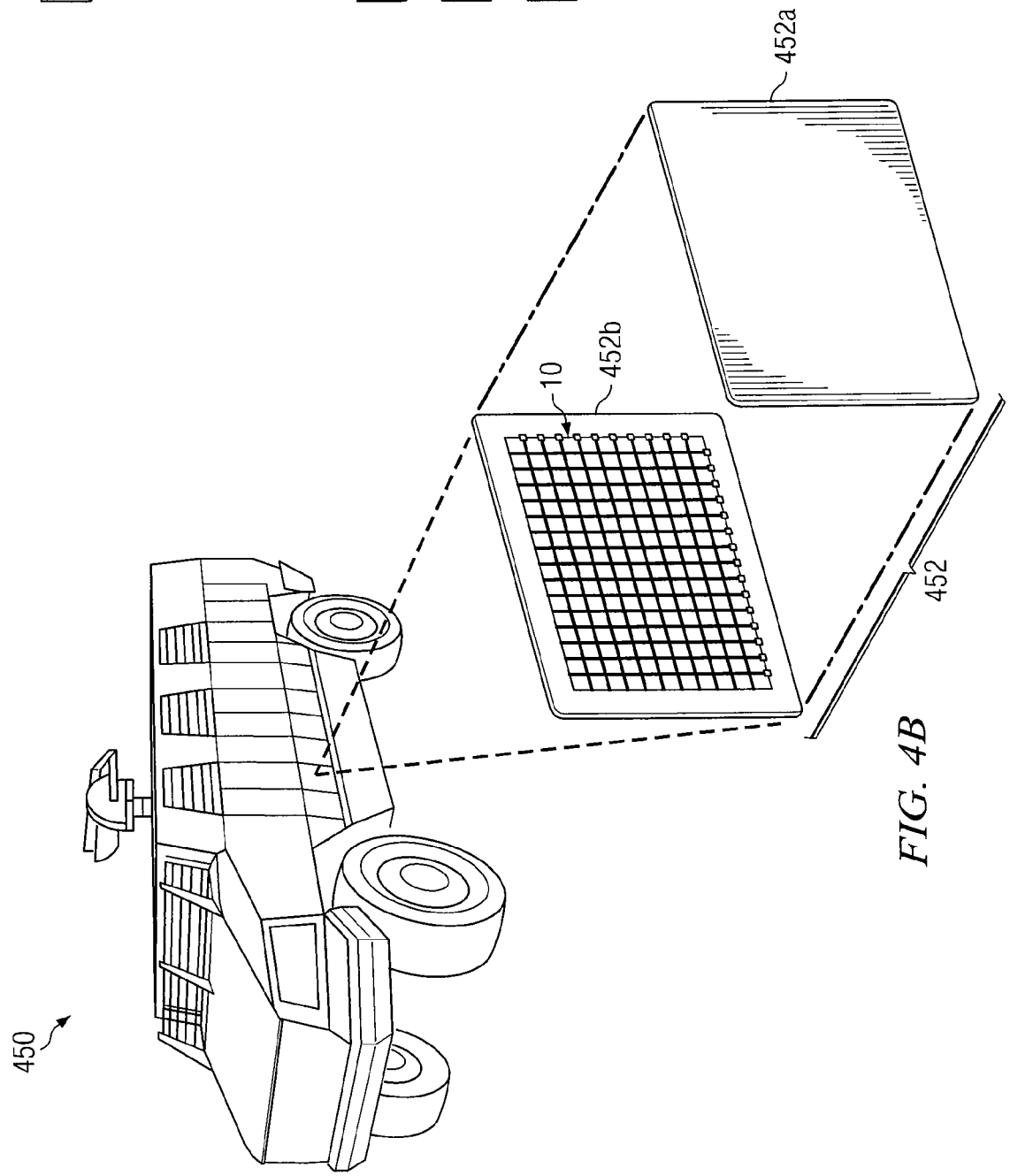
FIG. 4B illustrates another example of the placement of a hit sensor such as in FIG. 1A.
Figure 4A:
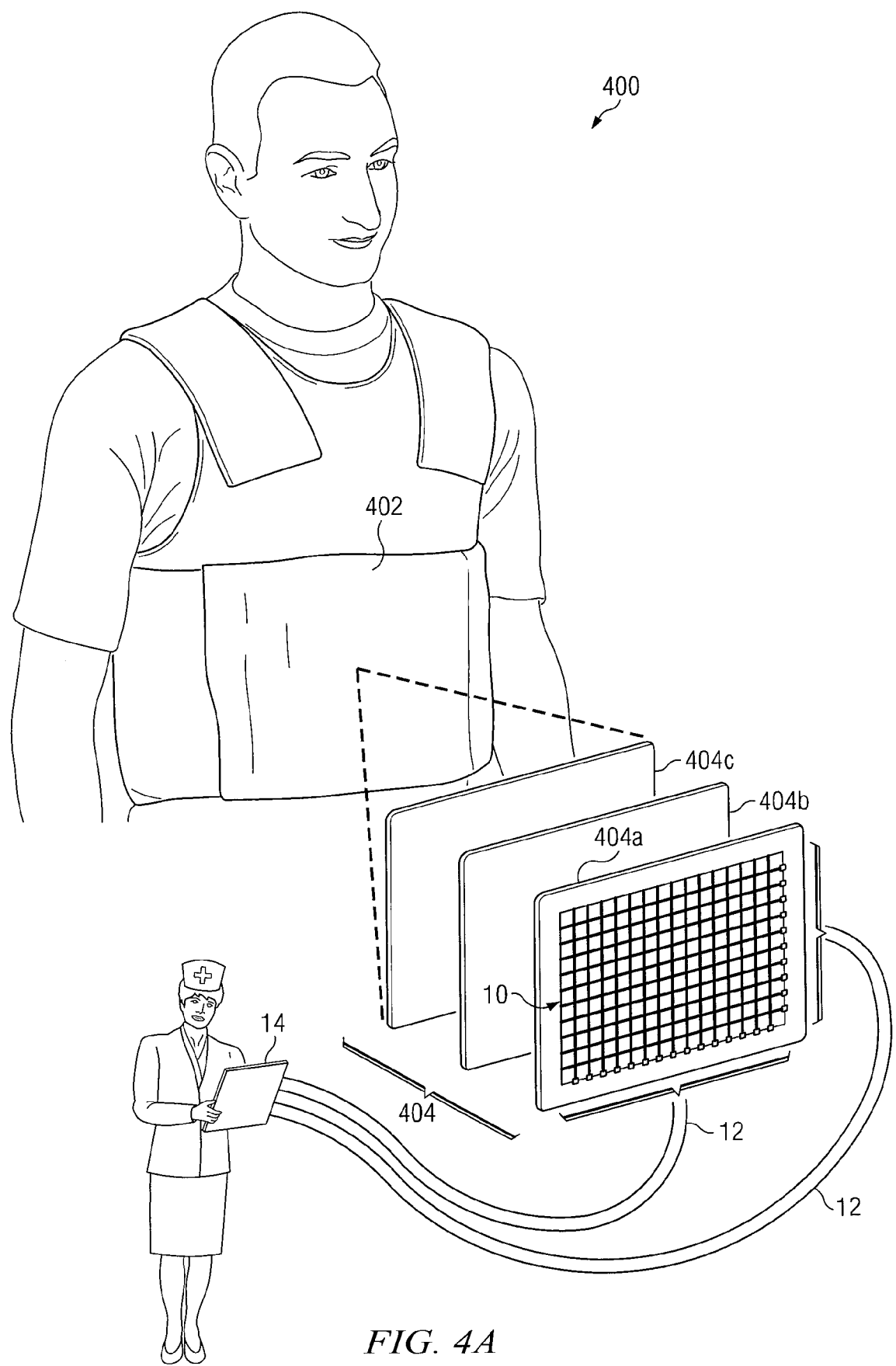
FIG. 4A illustrates one example of the placement of a hit sensor such as in FIG. 1A.

FIG. 4A illustrates one embodiment of a hit locator system 1. In this embodiment, person 400 wears body armor 402. Body armor 402 includes layers 404. In some embodiments, there may be only one layer 404. In this embodiment, hit sensor 10 is embedded into layer 404a. Layers 404b and 404c provide further protection from projectiles. Layers 404a-c are present all around body armor 402. Each of the layers 404 may be used for ballistic protection. Layers 404 may be composed of metallic or composite materials. In this manner, hit sensor 10 may also be present all around body armor 402. In the depicted embodiment, hit sensor 10 is coupled to computer 14 via connections 12. In operation, if body armor 402 was impacted by a projectile, hit sensor 10 may send signals to computer 14 via connections 12; computer 14 may process these signals and provide information regarding the location of the impact on body armor 402. The transmitted information may be advantageous in that it could increase the probability of saving lives since it may communicate valuable information about the location of the wound. In other examples, hit sensor 10 may be embedded into other articles of clothing or worn equipment.

In some embodiments, hit sensor 10 and computer 14 need not remain constantly connected. In certain embodiments, connections 12 are established when information about impacts on body armor 402 is desired.

FIG. 4B illustrates another embodiment of hit locator system 1. In this example, armored vehicle 450 includes layers 452. Layers 452 may be made of metallic or composite material. Layers 452 may be situated all around armored vehicle 450. In this example, layer 452a is the outermost layer made of metallic material while layer 452b is situated behind metallic layer 452a and includes composite material. Further, hit sensor 10 is placed within layer 452b. In this manner, hit sensor 10 may also be situated all around armored vehicle 450. In some embodiments, armored vehicle 450 is in a combat situation. In certain embodiments, when armored vehicle has been impacted by a projectile, hit sensor 10 communicates the location on the armored vehicle of the impact as described with respect to FIGS. 2A and 2B. As another example, computer 14 may be configured to receive the location information transmitted by hit sensor 10 and display the location of the impact on display 16. Further, computer 14 may correlate the impact information with a database of equipment on armored vehicle 450 stored in memory 20 or storage 21 and provide a list of potentially damaged equipment. In other examples, hit sensor 10 may be placed anywhere on the vehicle. Hit sensor 10 may also be placed within any number and types of layers on the vehicle.

Particular embodiments of a hit locator system have been described. Use of the hit locator system will add virtually no weight while, in some cases, improving ballistic performance of armor systems. Further, the hit locator system may provide insight into potentially damaged equipment in some embodiments. It may also give vital medical information if, for example, it is used on body armor.

Although several embodiments have been illustrated and described in detail, it will be recognized that modifications and substitutions are possible without departing from the spirit and scope of the appended claims.

What is claimed is:

1. A system for locating impacts, comprising:
   at least two passive arrays of a plurality of aligned single walled carbon nanotubes, each carbon nanotube operable to emit electrical activity when compressed;
   at least one sensor coupled to the at least two arrays configured to detect emitted electrical activity from the plurality of single walled carbon nanotubes; and
   a computer configured to determine the location of an impact on the at least two arrays in response to the detected emitted electrical activity from the plurality of single walled carbon nanotubes.

2. The system of claim 1, wherein the at least two passive arrays of a plurality of single walled carbon nanotubes is situated in a manner selected from the group consisting of: within at least one article of clothing, over at least one article of clothing, and underneath at least one article of clothing.

3. The system of claim 2, wherein the at least one article of clothing includes body armor.

4. The system of claim 1, wherein the at least two passive arrays of a plurality of single walled carbon nanotubes is situated in a vehicle.

5. The system of claim 4, wherein the vehicle is an armored vehicle.

6. The system of claim 1, wherein:
   the computer further comprises a database of equipment; and
   the computer is further configured to provide a list of potentially damaged equipment based on the location of the impact.

7. The system of claim 1, wherein the at least two arrays of a plurality of carbon nanotubes are configured to form at least one grid.

8. A method for locating impacts, comprising:
 detecting electrical emissions from more than one of a plurality of aligned single walled carbon nanotubes arranged in at least two passive arrays in response to an application of pressure on the at least two arrays; and
 computing the location of an impact upon the at least two arrays based on which of the plurality of single walled carbon nanotubes emitted electrical activity.

9. The method of claim 8, further comprising situating the at least two passive arrays of a plurality of single walled carbon nanotubes in a manner selected from the group consisting of: within at least one article of clothing, over at least one article of clothing, and underneath at least one article of clothing.

10. The method of claim 9, wherein the at least one article of clothing includes body armor.

11. The method of claim 8, further comprising situating the at least two passive arrays of a plurality of single walled carbon nanotubes in a vehicle.

12. The method of claim 11, wherein the vehicle is an armored vehicle.

13. The method of claim 8, further comprising:
 coupling a database of equipment to the computer;
 correlating the database of equipment with the location of the impact; and
 returning a list of potentially damaged equipment from the database of equipment.

14. The method of claim 8, wherein the at least two arrays of a plurality of carbon nanotubes are configured to form at least one grid.

15. A system for use in locating impacts, comprising:
 a plurality of aligned single walled carbon nanotubes configured in a passive grid, each carbon nanotube operable to emit electrons when compressed; and
 a plurality of electrical sensors coupled to respective sets of the plurality of single walled carbon nanotubes, each electrical sensor configured to provide an electrical signal indicating that its respective set of single walled carbon nanotubes has been compressed, thereby allowing determining of a location of impact of an object on the grid.

16. The system of claim 15, wherein the passive grid of a plurality of single walled carbon nanotubes is situated in a manner selected from the group consisting of: within at least one article of clothing, over at least one article of clothing, and underneath at least one article of clothing.

17. The system of claim 15, wherein the passive grid of a plurality of single walled carbon nanotubes is situated in a manner selected from the group consisting of: in a vehicle and in an armored vehicle.

* * * * *